United States Patent [19]
Henneberger et al.

[11] Patent Number: 5,452,150
[45] Date of Patent: Sep. 19, 1995

[54] DATA CARTRIDGE WITH MAGNETIC TAPE MARKERS

[75] Inventors: Stacy A. Henneberger, Apple Valley, Minn.; Christopher L. Hill, Woodbury, Wash.; Richard W. Molstad, St. Paul, Minn.; Alan R. Olson, Cottage Grove, Minn.; Steven R. Seeman, Stillwater, Minn.

[73] Assignee: Minnesota Mining and Manufacturing Company, St. Paul, Minn.

[21] Appl. No.: 266,003

[22] Filed: Jun. 27, 1994

[51] Int. Cl.[6] .......................... G11B 5/09; G11B 15/18
[52] U.S. Cl. .................................... 360/74.4; 360/48; 360/134; 360/132
[58] Field of Search ............... 360/48, 63, 72.2, 72.1, 360/74.4, 77.12, 84, 121, 132, 134, 137

[56] References Cited

U.S. PATENT DOCUMENTS

| | | | |
|---|---|---|---|
| 3,692,255 | 9/1972 | Von Behren | 242/192 |
| 4,422,111 | 12/1983 | Moeller et al. | 360/48 |
| 4,472,750 | 9/1984 | Klumpp et al. | 360/78.01 |
| 4,835,628 | 5/1989 | Hinz et al. | 360/48 |
| 4,975,791 | 12/1990 | Eggebeen | 360/77.01 |
| 5,008,765 | 4/1991 | Youngquist | 360/121 |
| 5,057,950 | 10/1991 | Ozaki et al. | 360/31 |
| 5,070,419 | 12/1991 | Kiyonaga | 360/10.3 |
| 5,073,834 | 12/1991 | Best et al. | 360/135 |
| 5,081,548 | 1/1992 | Inazawa et al. | 360/72.2 |
| 5,091,805 | 2/1992 | Odaka et al. | 360/48 |
| 5,101,302 | 3/1992 | Schönthaler et al. | 360/72.2 |
| 5,280,402 | 1/1994 | Anderson et al. | 360/77.12 |
| 5,291,348 | 3/1994 | Copolillo | 360/77.07 |
| 5,321,570 | 6/1994 | Behr et al. | 360/121 |
| 5,327,305 | 7/1994 | Thomas | 360/74.4 |
| 5,396,376 | 3/1995 | Chambors et al. | 360/48 |

FOREIGN PATENT DOCUMENTS 62-275358 11/1987 Japan ........................... 360/48

OTHER PUBLICATIONS

*Unformatted Magnetic Tape Cartridge for Information Interchange* by Quarter-Inch Cartridge Drive Standards, Inc. (QIC Development Standard), QIC-139, Revision E, Dec. 9, 1993.

Primary Examiner—Robert S. Tupper
Assistant Examiner—Jefferson Evans
Attorney, Agent, or Firm—Gary L. Griswold; Walter N. Kirn; Charles L. Dennis, II

[57] ABSTRACT

The tape in a data cartridge has a beginning of tape (BOT) zone adjacent a leading end, a load point (LP) zone adjacent the BOT zone, an end of tape (EOT) zone adjacent a trailing end, an early warning (EW) zone adjacent the EOT zone, and a data recording (DR) zone between the LP and EW zones. Servo tracks extending between the BOT and EOT enable the closed-loop servo operation of a tape deck during the recording of data at data flux transition densities within a predetermined range of flux transition densities. A BOT indicator includes a first type magnetic marker extending throughout the BOT zone and has a BOT flux density. An LP indicator includes spaced second type magnetic markers on the servo tracks at the border of the LP and DR zones. An EW indicator which is identical to the LP indicator is located on the servo tracks at the border of the DR and EW zones. An EOT indicator includes a first type marker extending throughout the EOT zone and has an EOT flux density. Digitally encoded cartridge information indicators including the spaced second type markers are located in each of the BOT and EOT zones. The BOT and EOT flux densities are different from one another, and sufficiently different from the data flux transition densities to enable the BOT and EOT indicators to be distinguished from the data. The second type markers of the LP and EW and cartridge information indicators are sufficiently different from the servo carrier flux density to enable the indicators to be distinguished from the servo carrier.

29 Claims, 3 Drawing Sheets

DATA CARTRIDGE WITH MAGNETIC TAPE MARKERS

BACKGROUND OF THE INVENTION

1. Field of the Invention

The present invention relates generally to magnetic tape cartridges of the type configured to be removably loaded into tape decks. In particular, the present invention is a data cartridge with magnetic markers for indicating different zones on the tape.

2. Description of the Related Art

High capacity data cartridges are generally known and disclosed, for example, in U.S. Pat. No. 3,692,225 (Von Behren) and U.S. Pat. No. 4,422,111 (Moeller et al.). Cartridges of this type are configured to be removably loaded into a tape deck having a magnetic read/write head assembly, and are commonly used to back-up computer systems. The cartridges include a length of magnetic tape wound on a pair of hubs rotatably mounted within an enclosure. When the cartridge is operatively loaded into a tape deck, an endless flexible belt in frictional contact with the outer layer of tape on both hubs drives the tape in forward and reverse directions along a transport path over the head assembly. Data can thereby be written to and read from the tape.

Data cartridge tapes are commonly divided into a number of functional zones. A Beginning of Tape (BOT) zone and an End of Tape (EOT) zone on the opposite ends of the tape are used to accelerate the tape to its operating speed and to decelerate the tape before the end is reached. Load Point (LP) and Early Warning (EW) zones are located adjacent to the BOT and EOT zones, respectively, and contain information used by the tape deck to perform operations in preparation for data recording and reading. Data is recorded in a Data Recording (DR) zone between the LP and EW zones.

The borders between adjacent zones typically are marked or indicated by coded patterns of small holes through the tape. Optical detection systems including a light source and photo-sensor within the tape deck are used to detect the presence of the holes. The hole patterns are decoded by the tape deck control system to identify the particular zones. Cartridge information (e.g., cartridge type) is also sometimes digitally encoded by patterns of holes in the BOT or EOT zones.

Data can be recorded on the DR zone of the tape in any one of a number of generally known or otherwise conventional formats. Tapes configured for recording data in servo-written streaming formats include servo track bands which extend longitudinally on the tape between the BOT and EOT zones. The servo track bands are formed by a prerecorded servo carrier from which rows of spaced blocks are erased to form rows of individual servo tracks. During closed-loop servo operation, the tape deck uses signals sensed from the servo tracks to vary the transverse position of the read/write head assembly to keep the head assembly aligned with or "locked" to a predetermined servo track. Tape cartridges of this type are described generally in development standards published by Quarter-Inch Cartridge Drive Standards, Inc. of Santa Barbara, Calif. Magnetic read/write heads and methods by which the heads are operated to record data in servo-written streaming formats are disclosed in U.S. Pat. No. 5,008,765 (Youngquist) and U.S. Pat. No. 5,280,402 (Anderson et al.).

U.S. Pat. No. 4,422,111 (Moeller et al.) referred to above discloses a data cartridge with a pre-formatted tape for recording information in a random-access manner. A first set of magnetic patterns represents the BOT zone, while a second set of patterns represents the EOT zone. Magnetic key patterns also are located at uniformly spaced positions along the tape. Data is recorded in record locations between the key patterns.

Data cartridge manufacturers are working continually to increase the data recording capacity of the cartridges. In general, increased capacity is achieved by increasing the density at which data is recorded on the tape, and by making the tape thinner so more tape can be wound on the hubs. However, as the tape becomes thinner its opacity decreases, thereby making it more difficult to detect optically the hole patterns marking the different zones on the tape. The holes also can cause undesirable indentations to form on the overlying layers of tape. It is evident, therefore, that there is a continuing need for improved tape markers in data cartridges.

SUMMARY OF THE INVENTION

The present invention is an improved digital data tape cartridge which includes magnetic zone indicators. One embodiment of the cartridge includes a length of magnetic tape having a beginning of tape (BOT) zone adjacent a leading end of the tape, a load point (LP) zone adjacent the BOT zone, an end of tape (EOT) zone adjacent a trailing end of the tape, an early warning (EW) zone adjacent the EOT zone, and a data recording (DR) zone between the LP and EW zones. One or more servo tracks extend between the BOT and EOT zones and include a servo carrier having a flux transition density and a modulation period to enable closed-loop servo operation of a tape deck during recording of data at data flux transition densities within a predetermined data range of flux transition densities. The cartridge includes BOT, LP, EW and EOT indicators on the tape. The BOT and EOT indicators are formed by first type magnetic markers extending throughout the length and width of the BOT and EOT zones, respectively. The first type magnetic markers of the BOT and EOT indicators have flux transition densities which are sufficiently different from the flux transition densities of the data range to enable the magnetic markers of the BOT and EOT indicators to be distinguished from the data by the tape deck. The LP indicator is formed by a plurality of spaced second type magnetic markers on the servo tracks at the border of the LP and DR zones, while the EW indicator is formed by a plurality of the spaced second type magnetic markers on the servo tracks at the border of the EW and DR zones. The second type markers have flux transition densities which are sufficiently different from the servo carrier flux transition density to enable the second type magnetic markers of the LP and EW indicators to be distinguished from the servo carrier by the tape deck.

In one embodiment the flux transition densities of the BOT and EOT indicator markers are sufficiently different from one another to enable the tape deck to distinguish between the BOT and EOT indicator markers. The second type markers of the EW and LP indicators have sufficiently narrow lengths to minimize disruption of closed-loop servo operation of the tape deck. The second type markers of the LP and EW indicators also are spaced by a sufficient distance to enable recovery of closed-loop servo operation of the tape deck between the markers. The markers can be detected relatively easily by the tape deck to provide reliable indications of zone boundaries and presence.

Another embodiment of the cartridge includes digitally encoded cartridge information indicators on the tape in both the BOT and EOT zones. The cartridge information indicators are formed by a plurality of the spaced second type magnetic markers.

DETAILED DESCRIPTION OF THE PREFERRED EMBODIMENTS

Figure 1:
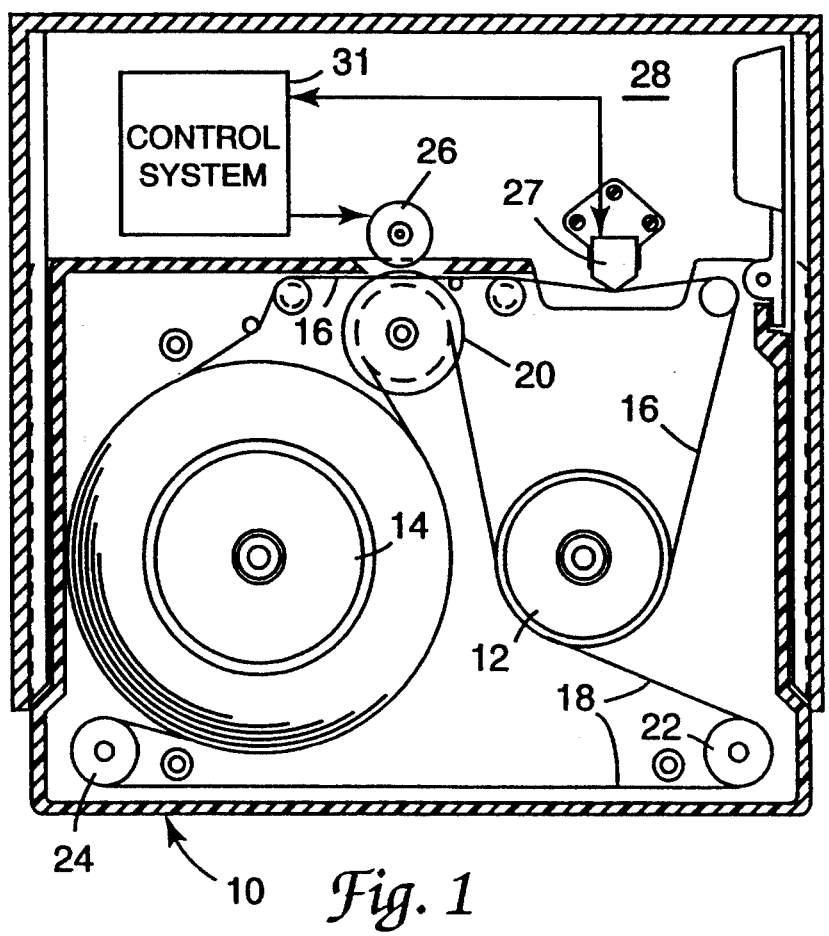
FIG. 1 is a cross-sectional view of a data cartridge with magnetic markers in accordance with the present invention, mounted within a tape deck.

A data cartridge 10 with magnetic tape markers in accordance with the present invention is shown in an operative position within a tape deck 28 in FIG. 1. Cartridge 10 includes a pair of hubs 12, 14 with a length of magnetic recording tape 16 wound thereon. Tape 16 is divided into a number of different longitudinally spaced zones which are indicated by zone indicators formed by prerecorded magnetic markers. Cartridge information indicators representative of the type or other characteristics of the cartridge are also recorded on tape 16 by the magnetic markers.

A flexible plastic belt 18 extends around a reversible belt-driving roller 20, a pair of belt guide rollers 22 and 24, and portions of the outer layer of tape 16 on hubs 12 and 14. Tape deck 28 includes a drive roller 26, magnetic read/write head assembly 27, and microprocessor-based control system 31. When cartridge 10 is inserted into tape deck 28 in the manner shown, recording tape 16 is slideably positioned adjacent to head assembly 27, with belt-driving roller 20 engaged with the cartridge drive roller 26. Drive roller 26 is rotated by a motor (not shown) to drive tape 16 in both forward and reverse directions along a transport path over head assembly 27. The magnetic markers on tape 16 are sensed magnetically as they are transported over head assembly 27. Control system 31 processes the signals generated by head assembly 27 to detect the magnetic markers and thereby identify the tape zone indicators and cartridge information indicators. This information is then used by control system 31 to control the operation of tape deck 28 in a conventional or otherwise known manner.

Figure 2:
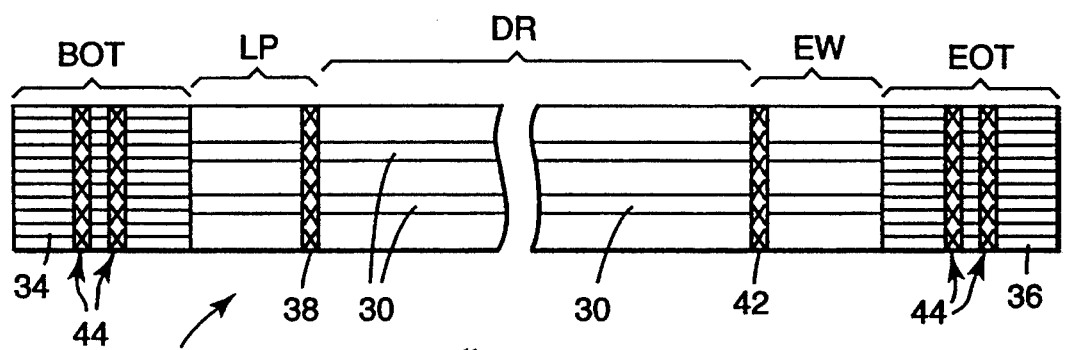
FIG. 2 is a diagrammatic illustration of the tape shown in FIG. 1.

As shown in FIG. 2, tape 16 is divided into five functional zones: BOT (Beginning of Tape), LP (Load Point), DR (Data Recording), EW (Early Warning) and EOT (End of Tape). The BOT zone is located on a first or leading end of tape 16. The LP zone is located directly adjacent the BOT zone. The EOT zone is located on a second or trailing end of tape 16. The EW zone is located immediately adjacent the EOT zone. The DR zone is located between the LP and EW zones.

The lengths of the BOT, LP, EW, and EOT zones are determined by the time required by control system 31 to perform the control or other functions associated with the particular zone (e.g., accelerating between stop and maximum tape speed in the BOT and EOT zones, and locking into closed-loop servo operating mode in the LP and EW zones). One embodiment of cartridge 10 is configured to operate at an established tape speed of 120 inches per second (ips) (3.05 m/s). In this particular embodiment, the BOT and EOT zones are 12 ft (3.66 m) in length, and the LP and EW zones are 8 ft (2.44 m) in length. The length of the DR zone varies with cartridge type, and is typically hundreds of feet (tens of meters) in length.

Figure 3:
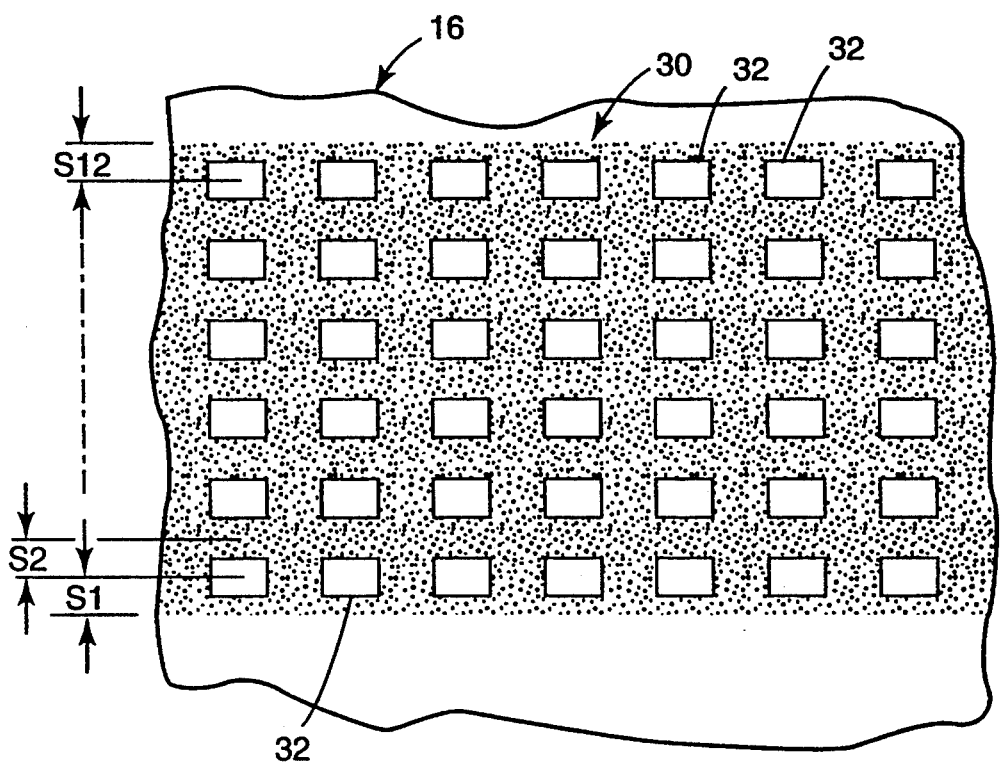
FIG. 3 is a detailed illustration of a servo track band on the tape shown in FIG. 2.

The DR zone is the primary area on which information is digitally recorded onto tape 16. In one embodiment of cartridge 10, the DR zone is configured for the recording of digital data in a servo-written streaming format. To facilitate the reading and writing of data in this format, prerecorded servo track bands 30 extend along the length of tape 16 between the BOT and EOT zones. The embodiment of tape 16 shown in FIG. 2 includes two transversely spaced servo track bands 30. FIG. 3 is a detailed illustration of one servo track band 30 which includes twelve servo tracks S1–S12. Servo tracks S1–S12 are formed by transversely spaced rows of erased blocks 32 from the servo track band which is otherwise continuously recorded with a servo carrier signal. The recorded servo carrier signal on servo track band 30 is represented by the speckling in FIG. 3. The number of recorded magnetic flux changes in the servo carrier signal is defined as the servo carrier flux transition density. The servo carrier modulation period is defined as the spacing or period of erased blocks 32 within servo track band 30. The modulated servo carrier signals from servo tracks S1–S12 are read by head assembly 27 and used as feedback signals by control system 31 to control the position of the head assembly and lock the head assembly to desired servo tracks when the control system is operated in closed-loop mode. During operation of control system 31 in open-loop mode, the position of head assembly 27 is controlled independently from information read from servo tracks S1–S12 (i.e., no feedback from the servo tracks), and the position of the head assembly is not locked to the servo tracks.

As shown in FIG. 2, the BOT zone is indicated by BOT indicator 34, which is illustrated by horizontal lines. BOT indicator 34 is formed by a prerecorded first type (type I) marker of magnetic flux changes over the entire BOT zone (i.e., over the full width and length of the zone). Output signals from any individual read/write head of head assembly 27 known to be over tape 16 can then be processed in a known or conventional manner to determine the presence of BOT indicator 34, even when tape deck 28 is being operated in an open-loop servo mode. The type I marker forming BOT indicator 34 is recorded at a first or BOT magnetic flux transition density.

An EOT indicator 36 is formed by a type I magnetic marker such as that described above, prerecorded within the entire EOT zone. The type I marker forming EOT indicator 36 is, however, recorded at a second or EOT magnetic flux transition density which is different than the flux transition density of the type I marker forming BOT indicator 34. BOT indicator 34 and EOT indicator 36 can thereby be distinguished by control system 31 to identify positively the presence of the BOT and EOT zones over head assembly 27.

The border of the LP and DR zones is indicated by LP indicator 38 at the intersection of these zones. LP indicator 38 is illustrated by cross hatching in FIG. 2.

Figure 4:
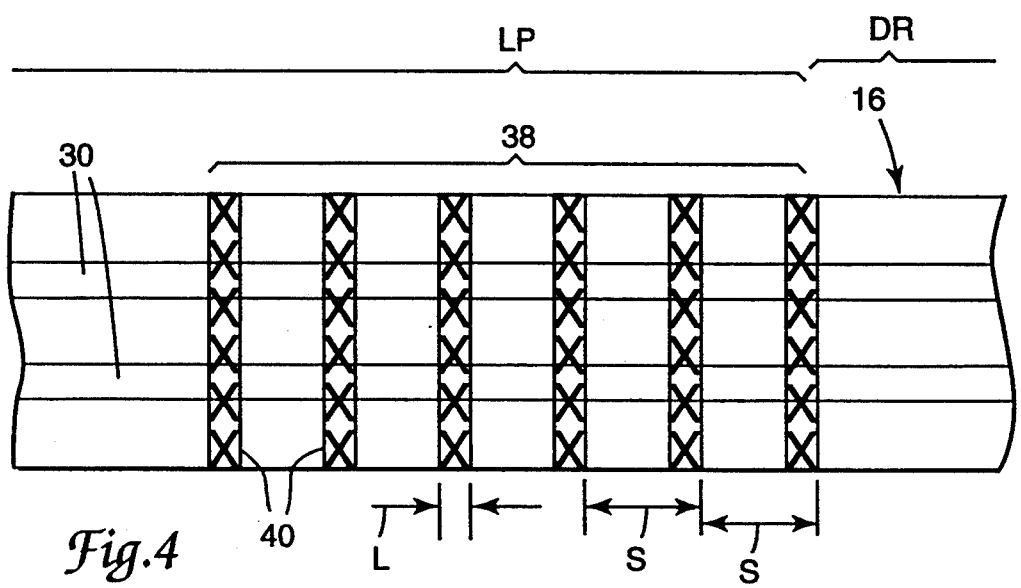
FIG. 4 is a detailed illustration of the LP zone indicator shown in FIG. 2.

As shown in greater detail in FIG. 4, LP indicator 38 is formed by a plurality of second or type II markers 40. The embodiment of LP indicator 38 shown in FIG. 4 includes six type II markers 40. Each type II marker 40 has a length L, and is spaced from adjacent markers 40 by a distance S. Magnetic markers 40 of LP indicator 38 all preferably are recorded with the same flux transition density, but a flux transition density different than that of the type I markers forming BOT indicator 34 and EOT indicator 36.

Referring back to FIG. 2, the border of the DR and EW zones is indicated by EW indicator 42 at the intersection of these zones. In one embodiment, EW indicator 42 is identical to LP indicator 38 described above, and formed from six type II markers 40 previously described.

Output signals from head assembly 27 are processed by the control system 31 of tape deck 28 to determine the presence of LP indicator 38. LP and EW indicators 38 and 42, respectively, need not be differentiable from one another. In one embodiment, tape deck control system 31 uses the detection of two consecutive type II markers in LP or EW indicators 38 and 42 as the identification of the indicators. Once the indicators are identified, the absence of two consecutive type II markers is used as the identification of the end of indicators 38 and 42. Tape deck 28 typically is operated in closed-loop servo mode while the LP, DR and EW zones are being transported over head assembly 27. Markers 40 forming LP indicator 38 and EW indicator 42 need therefore be located only over servo track groups 30. In the embodiment shown in FIG. 2, however, LP indicator 38 and EW indicator 42 extend across the width of tape 16.

A pair of cartridge information indicators 44 are recorded in each of the BOT and EOT zones over BOT indicator 34 and EOT indicator 36, respectively. Cartridge type, capacity and other desired information can be recorded by indicators 44. In one embodiment, cartridge information is digitally encoded in indicators 44 by an eight bit self-clocking code having the following format.

m m m m x m x m x m x m x m x m x m x m m m m

Figure 5:
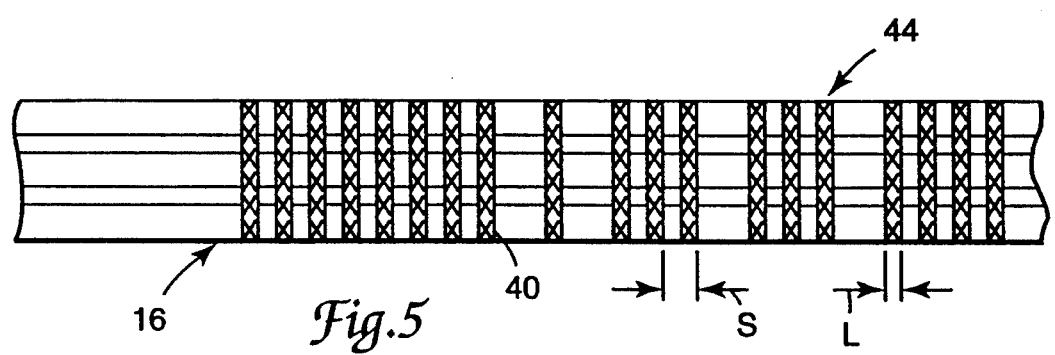
FIG. 5 is a detailed illustration of the cartridge information indicator shown in FIG. 2.

Each "m" in this code format is a type II marker 40 of the type described above. Each "x" is either a type II marker 40, or the absence of a type II marker. Each type II marker 40 of cartridge information indicators 44 has a length L and is spaced from adjacent markers 40 by a distance S. Two cartridge information indicators 44 are included in each BOT and EOT zone for purposes of redundancy. The information in cartridge information indicators 44 is ordered so it can be read by tape deck 28 while tape 16 is being transported in the reverse direction in the BOT zone and in the forward direction in the EOT zone. FIG. 5 is an illustration of one cartridge information indicator 44 encoded with the hexadecimal characters "CA" (11001010)in the format described immediately above. Other code formats using type II markers 40 also can be used for cartridge information indicators 44. Since the cartridge information indicators 44 are located within the BOT and EOT zones where tape deck 28 typically is operated in an open-loop servo mode, the type II markers 40 forming the cartridge type indicators must extend across the entire width of tape 16 so they can be sensed by head assembly 27.

The length L of the type II markers 40, the distance S between the type II markers, and the flux transition density at which these markers are recorded, are optimized to take into account a variety of factors. Since the type II markers 40 forming the LP indicator 38 and the EW indicator 42 must be capable of being detected over servo track groups 30 while tape deck 28 is operating in closed-loop servo mode, the type II markers must be recorded at a flux transition density that can be detected and distinguished from the servo carrier flux transition density. Type II markers having a flux transition density which is at least about 20 percent greater or less than that of the servo carrier signal are generally capable of being accurately distinguished from the servo carrier signal. Although it is desirable that the length L of markers 40 be as great as possible to facilitate the detection of these markers, the greater the length of the type II markers the greater the number of servo carrier modulation periods that will be lost, therefore increasing the likelihood that the closed-loop servo mode operation may be disrupted. The spacing S must be sufficient to enable the tape deck 28 to recover closed-loop servo operation between type II markers 40. The type I markers 34 and 36 must also be recorded at a flux transition density that can be detected and distinguished from the range of flux transition densities of the data recorded on tape 16. Type I markers having flux transition densities which are at least about 20 percent greater or less than those of the data are generally capable of being accurately distinguished from the recorded data.

One embodiment of data cartridge 10 is configured to be driven at an established tape speed of 120 ips (inches per second) (3.05 m/s). The lowest flux transition density at which data is recorded on the tape 16 of this cartridge 10 is 12.75 KFCI (kilo flux changes per inch) (0.502 KFC/mm), or a frequency of 762 KHz at the established tape speed. The servo carrier flux transition density in this embodiment of cartridge 10 is 6.767 KFCI (0.266 KFC/mm), a frequency of 406 KHz at the established tape speed. Erased blocks 32 are spaced within the servo carrier groups 30 to provide a servo carrier modulation period of 0.012 inches (0.305 mm).

In one embodiment of the tape cartridge 10 described in the preceding paragraph, the type II markers 40 are recorded at a density of 10.15 KFCI (0.400 KFC/mm), or 609 KHz at the established tape speed. This flux transition density is greater than the servo carrier flux transition density, yet less than the minimum data flux transition density. Type II markers 40 of this density can thereby be relatively easily distinguished from the servo carrier signal and data signals. The length L of each type II marker 40 is 0.09 inches (2.29 mm), an amount which corresponds to 75% of the length of one servo carrier modulation period. No more than two servo carrier modulation periods therefore are disrupted by the type II markers 40, yet the markers contain forty-five flux transition periods, a sufficient number of periods for the control system 31 of tape deck 28 to identify the markers. Since no more than two servo carrier modulation periods are disrupted, the type II markers 40 will not substantially affect closed-loop servo mode operation. The type II markers 40 are spaced from one another by a distance S of 0.5 inches (12.7 mm). This distance S gives the control system 31 of tape deck 28 approximately forty servo carrier modulation periods to recover between markers 40.

The type I BOT indicator 34 in the embodiment of cartridge 10 described above is recorded at a density of 4.0 KFCI (0.157 KFC/mm), a frequency of 240 KHz at the established tape speed. EOT indicator 36 in this embodiment of cartridge 10 is recorded at a density of 2.67 KFCI (0.105 KFC/mm), a frequency of 160 KHz at the established tape speed. This flux transition density of the type I BOT indicator 34 and EOT indicator 36 are well below the flux transition densities of type II markers 40, the servo carrier flux transition density and minimum data flux transition density. BOT indicator 34 and EOT indicator 36 can therefore be easily differentiated and detected from these other indicators and signals. The flux transition densities of BOT indicator 34 and EOT indicator 36 are also sufficiently different from one another that they can be distinguished by control system 31.

Data cartridges 10 having type I and type II markers in accordance with the present invention offer considerable advantages. Zone delineations can be determined using existing tape deck components (i.e., head assembly and control system) required for normal operation. Dedicated optical systems for detecting holes therefore are not required. These markers can easily be recorded on the tape during the cartridge manufacturing operation (i.e., prerecorded). The markers also are detected relatively easily and reliably by the tape deck control system. Thinner tape can also be used since light transmissivity and hole impressions no longer are design factors that need to be considered.

Although the present invention has been described with reference to preferred embodiments, those skilled in the art will recognize that changes may be made in form and detail without departing from the spirit and scope of the invention.

We claim:

1. A digital data tape cartridge of the type including a length of magnetic tape mounted for movement along a transport path and having a plurality of adjacent and longitudinally spaced zones, including a data recording zone having at least one longitudinally extending servo track with a servo carrier having a flux transition density, the cartridge configured for operation in conjunction with a tape deck for the recording of data in the data recording zone, characterized by a magnetic zone boundary indicator on the tape present at at least one data recording zone boundary and intersecting said at least one servo track, each zone boundary indicator including a plurality of spaced magnetic markers having a flux transition density that is sufficiently different from the servo carrier flux transition density to enable the magnetic markers of each zone boundary indicator to be distinguished from the servo carrier by the tape deck.

2. The data cartridge of claim 1, further characterized by the tape having a plurality of the magnetic zone boundary indicators on the tape, including magnetic zone boundary indicators at two data recording zone boundaries.

3. The data cartridge of claim 1 wherein the tape further includes a load point zone adjacent the data recording zone, and the cartridge is further characterized by a magnetic zone boundary indicator at the boundary of the data recording zone and the load point zone.

4. The data cartridge of claim 3 wherein the tape further includes an early warning zone adjacent the data recording zone and opposite the data recording zone from the load point zone, and the cartridge is further characterized by a magnetic zone boundary indicator at the boundary of the data recording zone and the early warning zone.

5. The data cartridge of claim 1 wherein the tape further includes at least one tape end zone and is configured for the recording of data at flux transition densities within a predetermined data range of flux transition densities, and the cartridge is further characterized by at least one magnetic tape end zone indicator on the tape at at least one tape end zone, each tape end zone indicator including a magnetic marker extending throughout the length and width of the tape end zone and having a flux transition density that is sufficiently different from the flux transition densities of the data range to enable the magnetic markers of each tape end zone indicator to be distinguished from the data by the tape deck.

6. The data cartridge of claim 5 wherein the tape further includes beginning of tape and end of tape zones on opposite ends of the tape, and the cartridge is further characterized by a tape end zone indicator at both the end of tape zone and the beginning of tape zone.

7. The data cartridge of claim 6, further characterized by the magnetic marker of the end of tape zone having a flux transition density that is sufficiently different from the flux transition density of the magnetic marker of the beginning of tape zone to enable the magnetic marker of the beginning of tape zone to be distinguished from the magnetic marker of the end of tape zone by the tape deck.

8. The data cartridge of claim 5, further characterized by the magnetic marker of each zone boundary indicator having a flux transition density that is sufficiently different from the flux transition density of each tape end zone indicator to enable the magnetic marker of each zone boundary indicator to be distinguished from the magnetic marker of each tape end zone indicator.

9. The data cartridge of claim 1, further characterized by the magnetic markers of each zone boundary indicator extending across the width of the servo tracks.

10. The data cartridge of claim 9, further characterized by the magnetic markers of each zone boundary indicator extending across the width of the tape.

11. The data cartridge of claim 1 wherein the servo carrier has a modulation period to enable closed-loop servo operation of the tape deck during the recording of data, and the cartridge is further characterized by each zone boundary indicator having spaced magnetic markers of sufficiently narrow lengths to minimize disruption of closed-loop servo operation of the tape deck.

12. The data cartridge of claim 11, further characterized by each zone boundary indicator including a plurality of spaced magnetic markers having lengths less than about five servo carrier modulation periods.

13. The data cartridge of claim 11, further characterized by each zone boundary indicator including a plurality of spaced magnetic markers having lengths less than about one servo carrier modulation period.

14. The data cartridge of claim 11, further characterized by each zone boundary indicator including a plurality of spaced markers having a flux transition density greater than the servo carrier flux transition density.

15. The data cartridge of claim 1 wherein the servo carrier has a modulation period to enable closed-loop servo operation of the tape deck during the recording of data, and the cartridge is further characterized by magnetic data recording zone indicators including spaced magnetic markers spaced by a distance sufficient to enable recovery of closed-loop servo operation of the tape deck between the markers.

16. The data cartridge of claim 15, further characterized by each zone boundary indicator including a plurality of the markers spaced by a distance of at least about twenty servo carrier modulation periods.

17. The data cartridge of claim 15, further characterized by each zone boundary indicator including a plurality of the markers spaced by a distance of at least about forty servo carrier modulation periods.

18. The data cartridge of claim 1, further characterized by at least one digitally encoded cartridge information indicator on the tape, each cartridge information indicator including a plurality of spaced magnetic markers having flux transition densities that are sufficiently different from surrounding flux transition densities on the tape to enable the magnetic markers of the cartridge information indicators to be distinguished from the servo carrier by the tape deck.

19. The data cartridge of claim 18 wherein the tape further includes beginning of tape and end of tape zones on opposite ends of the tape and is configured for the recording of data at flux transition densities, within a predetermined data range of flux transition densities, and the cartridge is further characterized by end of tape zone magnetic indicators in the beginning of tape and end of tape zones, each end of tape zone indicator including a magnetic marker extending throughout the length and width of the tape end zone and having a flux transition density that is sufficiently different from the flux transition densities of the data range to enable the magnetic markers of each end of tape zone indicator to be distinguished from the data by the tape deck, and is further characterized by digitally encoded cartridge information indicators on the tape in the beginning of tape and end of tape zones, each cartridge information indicator including a plurality of spaced magnetic markers having flux transition densities that are sufficiently different from the flux transition densities of the end of tape zone indicators to enable the magnetic markers of the cartridge information indicators to be distinguished from the end of tape zone indicators by the tape deck.

20. The data cartridge of claim 18, further characterized by each cartridge information indicator including magnetic markers extending across the width of the tape.

21. The data cartridge of claim 18 wherein the servo carrier has a modulation period to enable closed-loop servo operation of the tape deck during the recording of data, and the cartridge is further characterized by cartridge information indicators including spaced magnetic markers having sufficiently narrow lengths to minimize disruption of closed-loop servo operation of the tape deck.

22. The data cartridge of claim 18 wherein the servo carrier has a modulation period for enabling closed-loop servo operation of the tape deck during the recording of data, and the cartridge is further characterized by magnetic cartridge information indicators including spaced magnetic markers spaced by a distance sufficient to enable recovery of closed-loop servo operation of the tape deck between the markers.

23. A digital data cartridge of the type including a length of magnetic tape mounted for movement along a transport path and having a beginning of tape (BOT) zone adjacent a leading end of the tape, a load point (LP) zone adjacent the BOT zone, an end of tape (EOT) zone adjacent a trailing end of the tape, an early warning (EW) zone adjacent the EOT zone, a data recording (DR) zone between the LP and EW zones, and one or more servo tracks extending between the BOT and EOT zones and including a servo carrier having a flux transition density and a modulation period, for enabling closed-loop servo operation of a tape deck during the recording of data at data flux transition densities within a predetermined range of data flux transition densities, the data cartridge comprising:

a BOT indicator including a first type magnetic marker extending throughout the width and length of the BOT zone and having a BOT flux transition density which is sufficiently different than the flux transition densities of the data range and the servo carrier to enable the magnetic marker of the BOT indicator to be distinguished from the data and the Servo carrier by the tape deck, an LP indicator including a plurality of spaced second type magnetic markers on the servo tracks at the border of the LP and DR zones, the second type markers having LP flux transition densities which are sufficiently different from the servo carrier flux transition density to enable the magnetic markers of the LP indicator to be distinguished from the servo carrier by the tape deck, an EW indicator including a plurality of spaced second type magnetic markers on the servo tracks at the border of the EW and DR zones, the second type markers having EW flux transition densities which are sufficiently different from the servo carrier flux transition density to enable the magnetic markers of the EW indicator to be distinguished from the servo carrier by the tape deck, and an EOT indicator including a first type magnetic marker extending throughout the width and length of the EOT zone and having an EOT flux transition density which is sufficiently different than the flux transition densities of the data range to enable the magnetic marker of the EOT indicator to be distinguished from the data by the tape deck.

24. The data cartridge of claim 23 wherein the second type markers of the LP and EW indicators have sufficiently narrow lengths to minimize disruption of closed-loop servo operation of the tape deck.

25. The data cartridge of claim 24 wherein the second type markers of the LP and EW indicators are spaced by a distance sufficient to enable the recovery of closed-loop servo operation of the tape deck between the markers.

26. The data cartridge of claim 25 wherein the LP flux transition density and EW flux transition density are the same density.

27. The data cartridge of claim 23 and further including at least one digitally encoded cartridge information indicator in each of the BOT and EOT zones, each cartridge information indicator including a plurality of the spaced second type markers having a flux transition density which is sufficiently different than the flux transition densities of the BOT and the EOT to enable the second type markers to be distinguished from the BOT and EOT by the tape deck.

28. The data cartridge of claim 27 wherein the second type markers of the LP, EW and cartridge information indicators have the same flux transition density.

29. The data cartridge of claim 28 wherein the BOT and EOT flux transition densities are different flux transition densities.

* * * * *

UNITED STATES PATENT AND TRADEMARK OFFICE
CERTIFICATE OF CORRECTION

PATENT NO. : 5,452,150

DATED : September 19, 1995

INVENTOR(S) : Henneberger et al.

It is certified that error appears in the above-indentified patent and that said Letters Patent is hereby corrected as shown below:

Title page, Inventors:, third line, "Woodbury, Wash.;" should be --Woodbury, Minn.;--.

Col. 1, line 14, "3,692,225" should be --3,692,255--.

Signed and Sealed this

Twenty-third Day of July, 1996

*Attest:*

BRUCE LEHMAN

*Attesting Officer*  *Commissioner of Patents and Trademarks*